(12) United States Patent
Parsons et al.

(10) Patent No.: US 8,157,242 B2
(45) Date of Patent: Apr. 17, 2012

(54) VALVE ACTUATOR WITH LOCK MECHANISM

(75) Inventors: Gerald R. Parsons, Caledonia, IL (US); William P. Windgassen, South Beloit, IL (US)

(73) Assignee: Schneider Electric Buildings, LLC, Loves Park, IL (US)

( * ) Notice: Subject to any disclaimer, the term of this patent is extended or adjusted under 35 U.S.C. 154(b) by 32 days.

(21) Appl. No.: 12/636,495

(22) Filed: Dec. 11, 2009

(65) Prior Publication Data

US 2011/0140015 A1    Jun. 16, 2011

(51) Int. Cl.
*F16K 31/44*    (2006.01)
(52) U.S. Cl. ........ 251/93; 251/97; 251/101; 251/129.11
(58) Field of Classification Search .............. 251/90–93, 251/95–97, 101–102, 110–111, 113, 129.03, 251/129.11–129.13
See application file for complete search history.

(56) References Cited

U.S. PATENT DOCUMENTS

| | | | |
|---|---|---|---|
| 1,590,074 A * | 6/1926 | Booker ............. 251/93 |
| 2,205,512 A | 6/1940 | Anderson, Jr. |
| 2,227,914 A * | 1/1941 | Saunders ........... 251/258 |
| 2,591,951 A | 4/1952 | Lowry |
| 2,646,074 A | 7/1953 | Hopkins |
| 2,761,424 A | 9/1956 | Hopkins |
| 2,855,828 A | 10/1958 | Girouard et al. |
| 3,319,646 A | 5/1967 | Smulka |
| 4,078,763 A * | 3/1978 | Yamamoto ........... 251/96 |
| 4,090,589 A | 5/1978 | Fitzwater |
| 4,130,030 A * | 12/1978 | Stratienko ........... 74/625 |
| 4,137,945 A * | 2/1979 | Cutts ............... 137/625.46 |
| 4,274,445 A * | 6/1981 | Cooper ............... 137/636.1 |
| 4,460,154 A | 7/1984 | Kunkle |
| 4,533,114 A | 8/1985 | Cory et al. |
| 4,549,446 A | 10/1985 | Beeson |
| 4,629,157 A * | 12/1986 | Tsuchiya et al. ........ 251/96 |
| 4,647,007 A | 3/1987 | Bajka |
| 4,702,123 A | 10/1987 | Hirao et al. |
| 4,705,063 A | 11/1987 | Robinson |
| 4,759,386 A * | 7/1988 | Grouw, III ........... 137/554 |
| 4,848,724 A * | 7/1989 | Pettinaroli ........... 251/95 |
| 5,062,611 A | 11/1991 | Hatton |
| 5,188,335 A * | 2/1993 | Pettinaroli ........... 251/95 |
| 5,205,534 A | 4/1993 | Giordani |
| 5,215,112 A * | 6/1993 | Davison ............. 137/385 |
| 5,310,021 A | 5/1994 | Hightower |
| 5,507,469 A * | 4/1996 | Soderberg ........... 251/248 |
| 5,513,831 A * | 5/1996 | Seward ............... 251/96 |
| 5,727,653 A | 3/1998 | Grossenbacher et al. |
| 5,758,684 A | 6/1998 | Hudson et al. |
| 5,832,779 A | 11/1998 | Madrid et al. |
| 6,073,907 A | 6/2000 | Schreiner, Jr. et al. |

(Continued)

FOREIGN PATENT DOCUMENTS

EP    1 347 249 A1    9/2003

(Continued)

*Primary Examiner* — John Bastianelli
(74) *Attorney, Agent, or Firm* — Reinhart Boerner Van Deuren P.C.

(57) ABSTRACT

A valve actuator with manual lock is provided. The valve actuator with manual lock includes a locking button arrangement that is operably coupled to a shaft extending along an axis of rotation of a drive train. The locking button arrangement is selectively engageable with a housing of the valve actuator to lock the drive train in a selected orientation.

18 Claims, 5 Drawing Sheets

U.S. PATENT DOCUMENTS

| | | | |
|---|---|---|---|
| 6,079,442 A * | 6/2000 | Raymond et al. | 137/554 |
| 6,260,819 B1 * | 7/2001 | Ovsepyan | 251/96 |
| 6,347,782 B1 | 2/2002 | Gill | |
| 6,408,901 B2 | 6/2002 | Holloway et al. | |
| 6,446,666 B1 | 9/2002 | Wadsworth et al. | |
| 6,463,955 B2 | 10/2002 | Hasak et al. | |
| 6,575,427 B1 * | 6/2003 | Rauch et al. | 251/69 |
| 6,595,487 B2 | 7/2003 | Johansen et al. | |
| 6,725,976 B2 | 4/2004 | Oh et al. | |
| 6,918,572 B2 | 7/2005 | Minegishi et al. | |
| 6,938,874 B2 * | 9/2005 | Kapczynski et al. | 251/110 |
| 6,974,119 B2 | 12/2005 | Brendle et al. | |
| 6,979,965 B2 | 12/2005 | McMillan et al. | |
| 7,017,884 B2 | 3/2006 | Brinks et al. | |
| 7,048,251 B2 | 5/2006 | Schreiner | |
| 7,055,795 B2 | 6/2006 | Lay | |
| 7,066,301 B2 | 6/2006 | Oh et al. | |
| 7,104,518 B1 | 9/2006 | Wood | |
| 7,178,781 B2 * | 2/2007 | Trappa | 251/96 |
| 7,509,972 B2 | 3/2009 | Nesbitt | |
| 2002/0108747 A1 | 8/2002 | Dietz et al. | |
| 2004/0129253 A1 | 7/2004 | Ozeki et al. | |
| 2004/0134665 A1 | 7/2004 | Greeb et al. | |
| 2004/0226538 A1 | 11/2004 | Cannone et al. | |
| 2005/0062000 A1 | 3/2005 | Bartell, Jr. et al. | |
| 2005/0151102 A1 | 7/2005 | Brinks et al. | |
| 2005/0263731 A1 | 12/2005 | Fauni | |
| 2005/0269535 A1 | 12/2005 | Bartell, Jr. et al. | |
| 2009/0194723 A1 | 8/2009 | Parsons | |
| 2009/0194724 A1 | 8/2009 | Parsons | |

FOREIGN PATENT DOCUMENTS

| | | |
|---|---|---|
| GB | 1 317 390 | 5/1970 |
| GB | 2 101 718 A | 1/1983 |
| JP | 2001207873 A | 8/2001 |
| JP | 2005140034 A | 6/2005 |
| WO | WO 99/24745 A1 | 5/1999 |
| WO | WO 2005/017381 A2 | 2/2005 |

\* cited by examiner

VALVE ACTUATOR WITH LOCK MECHANISM

FIELD OF THE INVENTION

This invention generally relates to valve actuators, and more particularly to valve actuators incorporating a fail safe device.

BACKGROUND OF THE INVENTION

In many contemporary mechanical systems such as valves, dampers, etc., an electro-mechanical actuation system is used to transition the mechanical system from one state to another. For example, a traditional ball valve or butterfly valve may have an electro-mechanical actuator attached to the valve stem thereof and operable to rotate the valve stem such that the valve is transitioned between a closed position and an open position.

Given that electro-mechanical actuators require a power supply, the actuator will fail to provide the desired actuation in the event of a power failure. As a result, many electro-mechanical actuators are often supplied with a mechanical override or fail-safe device that returns the valve to a default position in the event of a power failure. For example, an electro-mechanical actuator can be configured to return a valve to a normally closed or normally open state once the power supply of the electro-mechanical actuator fails. Such functionality is desirable in applications where a position of the valve, e.g. open or closed, is preferred only when power is present in the system.

However, in fail-safe type valve actuators, once the actuator loses power the valve returns to its default position, and it will remain in that state until power is restored to the valve actuator. As a result, the valve coupled to the valve actuator is confined to whatever default position the valve actuator is designed to return the valve to in the event of a power failure. In certain instances, however, it is desirable to maintain the valve coupled to the valve actuator in its pre-power failure state. For example, in a system configured with a fail-safe type valve actuator, it is desirable in some instances to place the valve in a pre-power failure state despite the continued absence of power so as to enable troubleshooting of the system. For another example, it may also be desirable to place a valve in a position other than the predetermined position defined by the fail-safe device during initial installation when no power supply is present.

Embodiments of the present invention relate to improvements in the art of valve actuators as discussed above. These and other advantages of the invention, as well as additional inventive features, will be apparent from the description of the invention provided herein.

BRIEF SUMMARY OF THE INVENTION

In a first aspect, an embodiment of the invention provides a valve actuator including a housing, a drive train carried within the housing, and a locking button arrangement operably connected to the drive train and selectively engageable with the housing. The locking button arrangement is selectively engageable with the housing between a locked position wherein rotational movement of the drive train is prohibited, and an unlocked position wherein rotational movement of the drive train is permitted.

In a subsidiary embodiment of the first aspect, The locking button arrangement includes a locking button having an opening configured to receive a sleeve of the locking button arrangement. The locking button is axially slideable along the sleeve to selectively engage the locking button with the housing.

In second aspect, an embodiment of the invention provides a valve actuator including, a housing, a drive train carried by the housing and having a plurality of interconnected gears, wherein each gear of the plurality of interconnected gears is required to transfer a torque from an input end of the plurality of interconnected gears to an output end of the plurality of interconnected gears.

A valve actuator according to the second aspect further includes a shaft extending from one of the plurality of interconnected gears along an axis of rotation thereof such that a rotation of the shaft corresponds to a rotation of each of the plurality of interconnected gears. An actuator return device is operably coupled to the shaft to rotate the drive train in a direction to a first predetermined position. A locking button arrangement is operably coupled to the shaft and selectively engageable with the housing between a locked position defined by a second predetermined position other than the first predetermined position and wherein the rotational movement of the drivetrain is prohibited, and an unlocked position wherein rotational movement of the drive train is permitted.

In a subsidiary embodiment of the second aspect, the locking button arrangement includes a locking button. The locking button has a locking feature having a first axially extending locking surface. The housing has a locking cavity that has a second axially extending locking surface, wherein the actuator return device is operable to bias the first and second locking surfaces into frictional engagement.

In a third aspect, an embodiment of the invention provides a method for actuating a valve including the steps of rotating a locking button arrangement operably coupled to a drive train of the valve actuator to a predetermined angular position; and engaging a housing of the valve actuator with the locking button arrangement. The step of engaging includes axially depressing a locking button of the locking button arrangement such that the locking button is in frictional engagement with the housing when the locking button is in the predetermined angular position.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
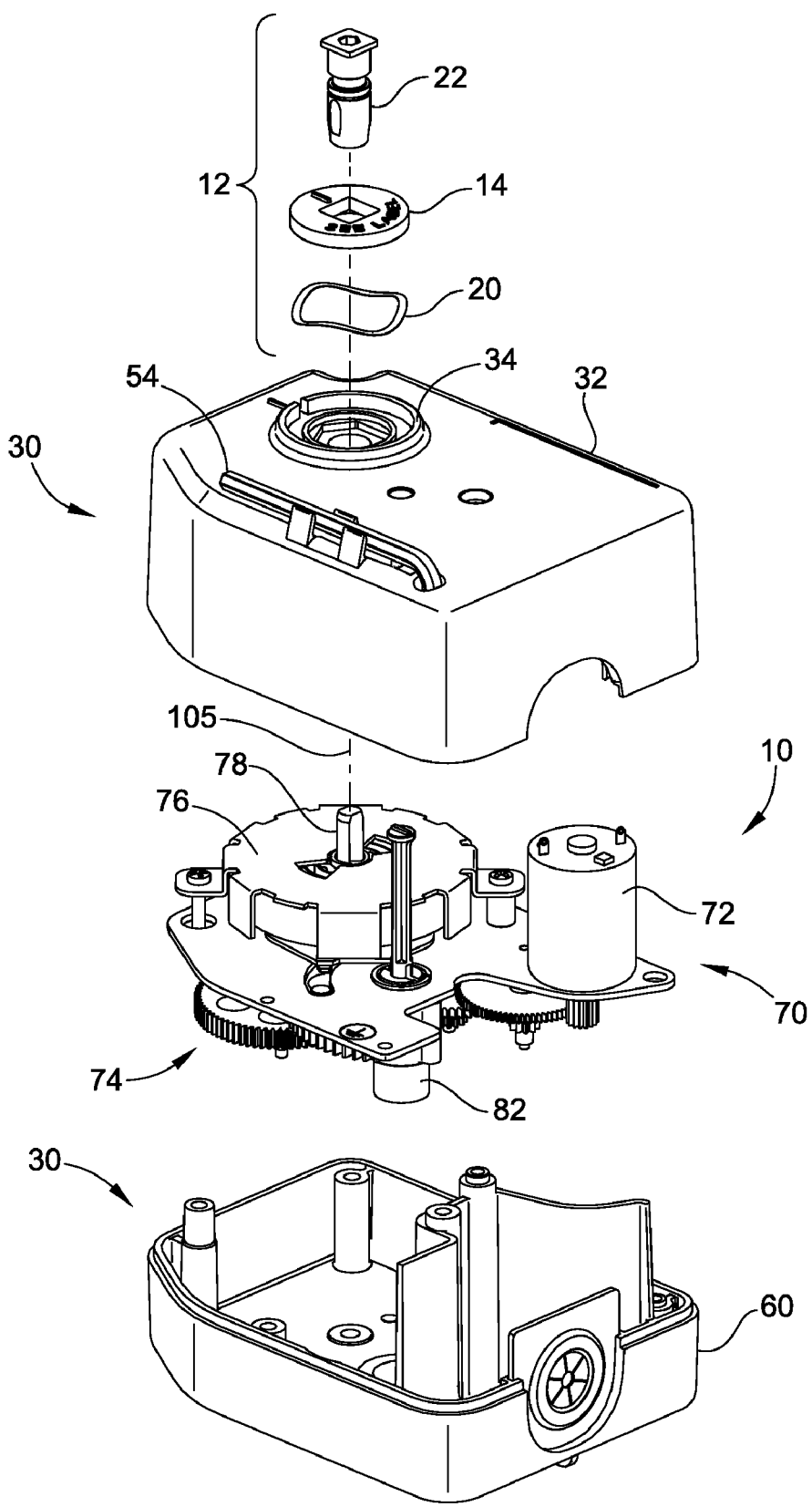
FIG. 1 is an perspective exploded view of an exemplary embodiment of a valve actuator with locking mechanism.

With reference to FIG. 1, a valve actuator 10 is illustrated. The valve actuator includes a two-piece housing 30, a locking button arrangement 12, and a drive train assembly 70. The housing 30 carries the drive train assembly 70 therein, and the locking button arrangement 12 is operably coupled to the housing 30 and the drive train assembly 70. As will be explained in greater detail below, the locking button arrangement 12 is operable to lock the drive train assembly 70 in a desired position through engagement with the housing 30.

Still referring to FIG. 1, the drive train assembly 70 includes a motor 72. The motor supplies the power required to drive the valve actuator 10 between desired positions. The motor 72 is coupled to a plurality of interconnected gears 74 operably coupling the motor 72 to an actuator coupling sleeve 82. The actuator coupling sleeve 82 receives a valve stem or other shaft of the valve that the valve actuator 10 operates upon.

The drive train 70 further includes an actuator return device 76. The actuator return device stores rotational energy and returns that rotational energy to the drive train 70 in the event that the power supply supplying power to the motor 72 fails. When such an event occurs, the actuator return device 76 supplies stored mechanical energy to the drive train 70 such that the drive train 70 returns a valve coupled to the valve actuator 10 to a predetermined desired position. This predetermined position can be what is known in the art as a normally closed or normally open state, or furthermore any position therebetween.

When the actuator return device 76 returns the valve coupled to the valve actuator 10 to the normally closed position, a valve coupled to the valve actuator 10 is closed. Similarly, in a normally open configuration, when the actuator return device 76 returns the valve connected to the valve actuator 10 to an open position, a valve coupled to the valve actuator 10 is opened.

As will be discussed in greater detail below, the locking button arrangement 12 allows a user to manually reposition the valve actuator 10 and more particularly the valve coupled to the valve actuator 10 to a position other than the predetermined position in the event of a power failure. In other words, the locking button arrangement 12 allows a user to reopen a normally closed valve that has been closed by way of the actuator return device 76 in the event of a power failure. Similarly, the locking button arrangement 12 allows a user to close a normally open valve when the actuator return device 76 has opened the valve in the event of a power failure. As such, the locking button arrangement 12 provides a manual override to a valve actuator 10 that incorporates an actuator return device 76 as a fail safe device.

Figure 2:
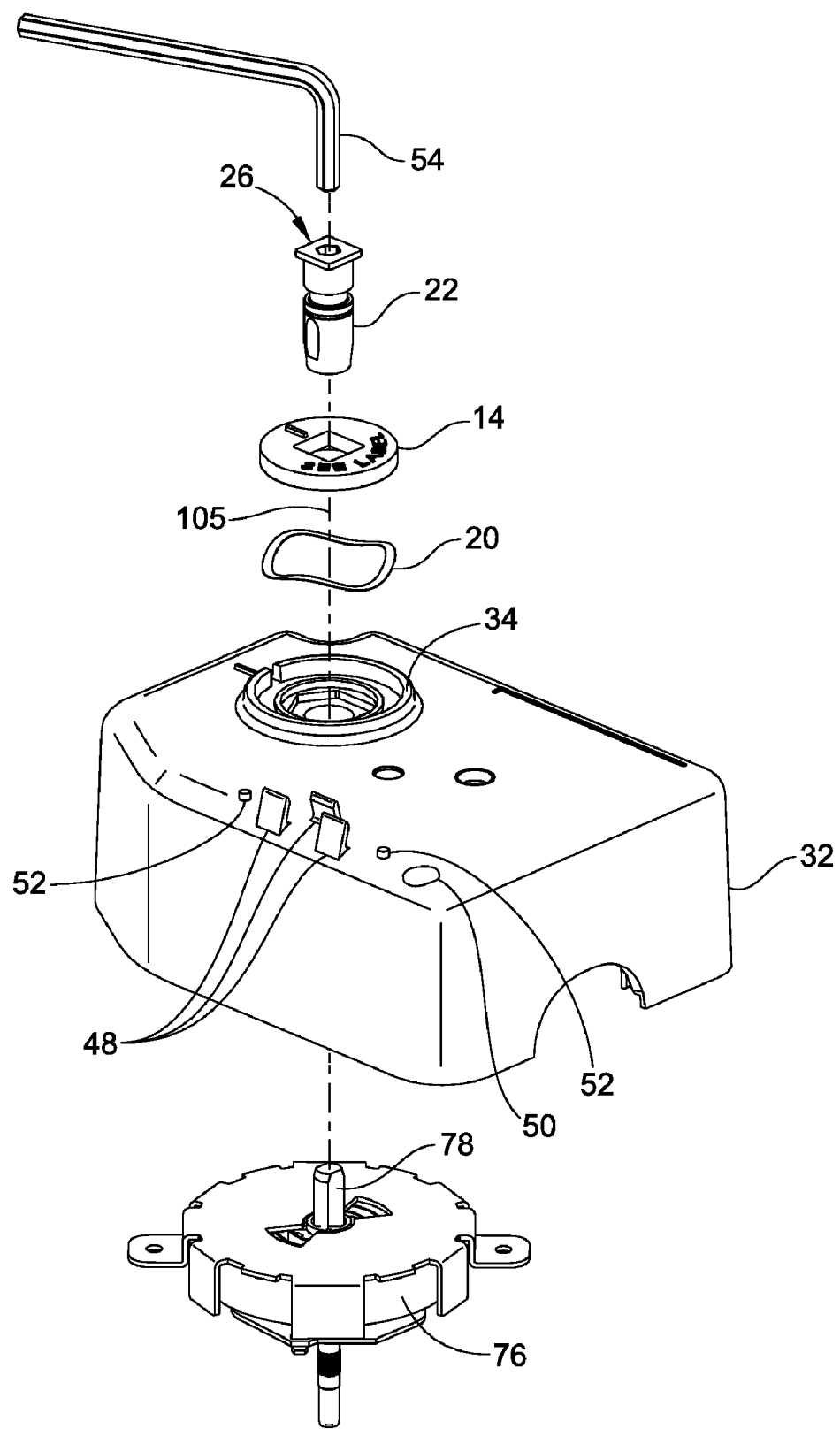
FIG. 2 is a prospective partial exploded view of a locking button arrangement of the valve actuator of FIG. 1.

With reference to FIG. 2 the locking button arrangement 12 is illustrated as including a locking button 14, a sleeve 22, and a biasing element 20. The locking button arrangement 12 is axially received in a locking button recess 34. The locking button recess 34 is formed into a top 32 of the housing 30. It will be recognized that the term "top" and "bottom" when used with respect to the housing 30 are merely terms used for illustrative purposes based on the orientation in the present figures, but the invention is not so limited.

The sleeve 22 is operably coupled to the actuator return device 76. More particularly, the sleeve 22 is keyed to receive a lock out shaft 78 extending from the drive train 70 such that the sleeve 22 cannot rotate relative to the lock out shaft 78. Also, the locking button 14 is configured to receive the sleeve 22 such that the locking button 14 cannot rotate relative to the sleeve 22. As such, when the locking button 14 is prevented from rotation so too is the lock out shaft 78, that ultimately prevents any rotation of the drive train 70.

Figure 3:
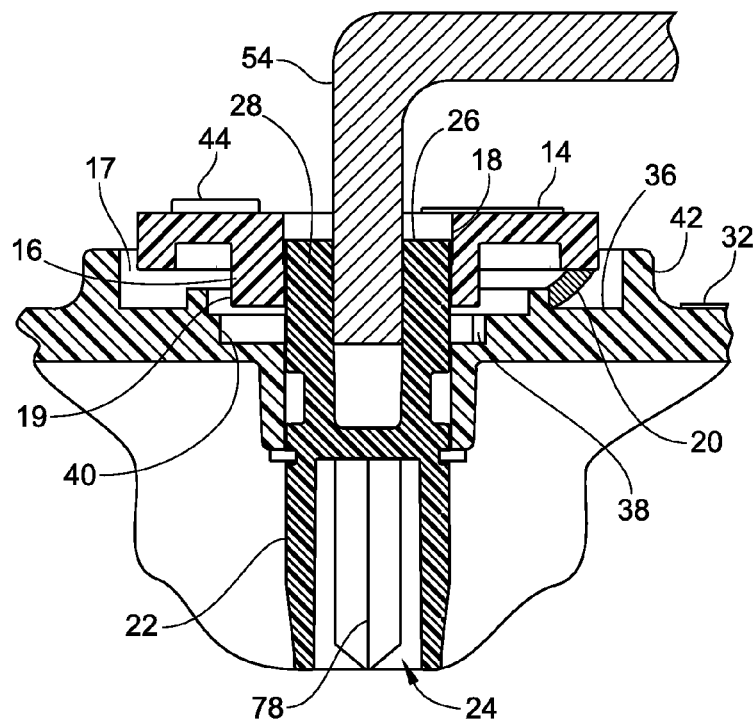
FIG. 3 is a partial side cross sectional view of the locking button arrangement in an unlocked position.
Figure 4:
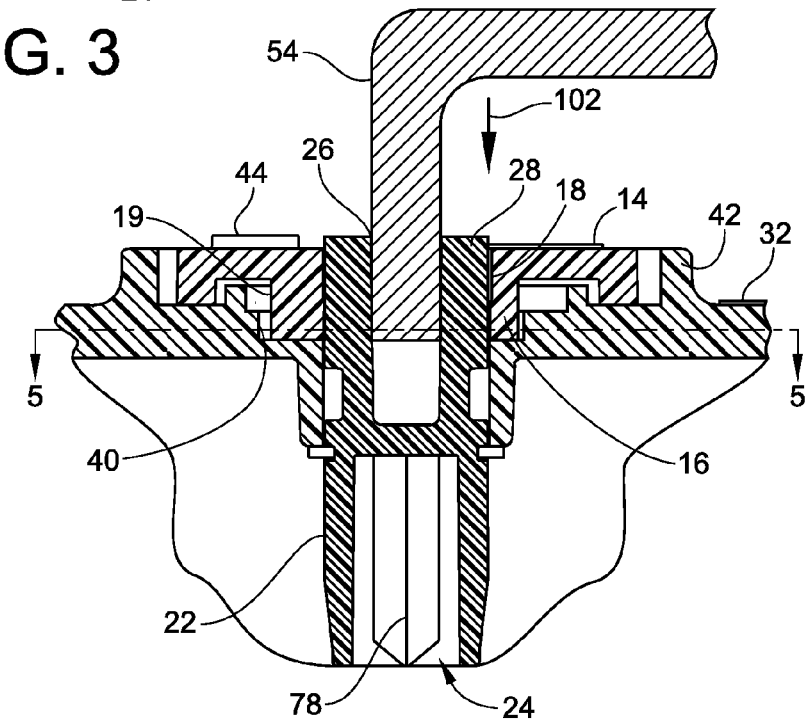
FIG. 4 is a partial side cross sectional view of the locking button arrangement in a locked position.

With reference to FIGS. 3 and 4, the sleeve 22 is illustrated as having a generally cylindrical profile. The sleeve 22 includes a shaft aperture 24 at a first axial end and a button mating feature 28 at a second axial end. Sleeve 22 also includes a tool receiving feature that is illustrated as a tool aperture 26 also at the second end of the sleeve. The tool aperture 26 is sized to receive a tool 54 that is keyed to the shape of the tool aperture 26.

The button mating feature 28 of the sleeve 22 is keyed to the shape of a sleeve mating feature 18 of the locking button 14 so that the sleeve 22 cannot rotate relative to the locking button 14. As such, a rotation of the sleeve 22 by action of the tool 54 therefore results in a rotation of the locking button 14. The locking button feature 28 and sleeve mating feature 18 are keyed to one another such that the locking button 14 is slidable in the axial direction relative to the sleeve 22. This functionality allows the locking feature 16 of the locking button 14 to be selectively axially positioned within the locking cavity by sliding the locking button 14 axially relative to the locking sleeve 22.

Although illustrated as using a common allen wrench for a tool 54, the sleeve 22 can be adapted to engage other types of tools. More particularly, in other embodiments the tool aperture 24 can take the form of a phillips head or standard head screw, or other similar geometrical shapes. However, an advantage to using an allen wrench for the tool 54 is the ability to easily provide a sufficient torque to the lock out shaft 78 of the drive train assembly 70.

Now referring to FIGS. 3 and 4, the locking button 14 is illustrated in the unlocked position (FIG. 3) and the locked position (FIG. 4). The locking button 14 includes a locking feature 16 extending axially away from an underside thereof. As will be explained in greater detail below the locking feature 16 includes an axially extending first locking surface 19 which maintains a frictional contact with a locking cavity 38 of the locking button recess 34 when in the locked position.

The locking button 14 further includes a guide flange 17. The guide flange 17 is operable to maintain the concentric relationship between the locking button 14 and the locking button recess 34. As such, the guide flange 17 extends axially away from an underside of the locking button 14 generally at an outer circumference thereof.

As noted above, the locking button 14 further includes a sleeve mating feature 18 in the form of an opening keyed to the button mating feature 28 of the sleeve 22. Also as noted above, the sleeve mating feature 18 receives the sleeve 22 in such a way that the locking button 14 is prevented from rotation relative to the sleeve 22 when the sleeve mating feature 18 engages the button mating feature 28. Although illustrated in FIG. 1 as having a generally round or disc shape, the locking button 14 can take on various other shapes. Additionally, although illustrated as separate components, the sleeve 22 and the locking button 14 can be configured as a one-piece body by, for example, injection molding.

Still referring to FIGS. 3 and 4 the locking button recess 34 is illustrated as axially receiving the locking button 14 in both the locked position and the unlocked position. The locking button recess 34 includes a locking cavity 38 which is configured and keyed to receive the locking feature 16 of the locking button 14. The locking button recess 34 further includes an annular channel 36 sized to receive the biasing element 20 in the form of a wave spring of the locking button arrangement 12. As best illustrated in FIG. 3, the locking cavity 38 includes an axially extending locking surface 40. As will be explained in greater detail below, the second locking surface 40 maintains a frictional contact with the first locking surface 19 of the locking feature 16 when the locking button 14 is in the locked position to prevent the locking button from being axially ejected from the locking cavity 38 under the load of the biasing element 20. (See FIG. 4).

Still referring to FIGS. 3 and 4, the biasing element 20 is shown illustrated disposed within an annular channel 36 and proximate to the guide flange 17 of the locking button 14. As illustrated, the biasing element 20 is a wave spring, however, in other embodiments the biasing element 20 may take the form of other biasing elements such as a compression spring or similar mechanical component.

Referring back to FIG. 1, the drive train assembly 70 is illustrated as carried within the housing 30. More particularly, the drive train assembly 70 is mounted to a bottom 60 of the housing 30 as well as a top 32 of the housing 30. The drive train assembly 70 includes a motor 72 and a plurality of interconnected gears 74 operatively connected to the motor such that each one of the plurality of interconnected gears is required to transmit a torque exerted at an input end of the drive train coupled to the motor 72 to an output end of the drive train defined by an actuator coupling sleeve 82. The lock out shaft 78 extends from the center of one of the plurality of interconnected gears 74 along an axis of rotation 105 thereof. As a result, the locking button arrangement 12 is coupled to the drive train 70 via the lock out shaft 78 without the need for additional gearing thereby reducing the overall cost of incorporating the locking button arrangement 12.

The actuator coupling sleeve 82 extends from one of the plurality of gears 74 and is operable to couple to the valve stem of a valve such that a rotation of the actuator coupling sleeve 82 results in a rotation of the valve stem. The lock out shaft 78 extends from the axis of rotation 105 of one of the plurality of interconnected gears 74 such that rotation of the lock out shaft 78 corresponds to rotation of the gear the lock out shaft 74 extends from. Although illustrated as using a conventional electric motor, the drive train can use other power supply sources, such as for non-limiting example a pneumatic drive.

The drive train assembly 70 also includes an actuator return device 76 in the form of a power spring 76. As illustrated, the power spring 76 is a coil or clock spring coiled about the lock out shaft 78. The power spring 76 is wound by the lock out shaft 78 when the motor 72 supplies a torque to the plurality of gears 74.

As discussed above, the actuator return device 76 is operable to return the valve coupled to the valve actuator 10 to a predetermined position such as a normally closed or normally open position by way of unwinding and thereby supplying a torque to the lock out shaft 78 once power to the motor 72 ceases. In this manner, the valve actuator 10 has an automatic reset function that places the valve in a predetermined setting in the event of a failure of the power supply of the valve actuator 10. As will be discussed in greater detail below, the locking arrangement 12 allows a user to manually place a valve coupled to the valve actuator 10 in a position other than the a position defined by the predetermined position of the valve actuator 10.

Turning back to FIG. 3, the locking button 14 is shown in the unlocked position. When in the unlocked position, the locking feature 16 of the locking button 14 is axially above the locking cavity 38 of the locking button recess 34. In this way, the locking button 14 is free to rotate a full 360 degrees within the locking button recess 34. As discussed above, the locking button 14 cannot rotate relative to the sleeve 22. Also as discussed above, the sleeve 22 fixedly receives the lock out shaft 78. As a result, any rotation of the locking button 14 will also result in a rotation of the sleeve 22, that in turn will result in a rotation of the lock out shaft 78, that ultimately in turn will result in the rotation of a valve member connected to a actuator coupling sleeve 82 (see FIG. 1).

Accordingly, when the motor 72 supplies a torque to the plurality of interconnected gears 74 the lock out shaft 78 rotates. So long as the locking button 14 is in the unlocked position as shown in FIG. 3, the locking button is free to rotate within the locking button recess 34. This functionality allows the valve actuator 10 to freely operate without unwanted jamming or locking when the locking button is not desired to be in the locked position as shown in FIG. 4. More particularly, and as will be discussed in greater detail below, the locking button 14 maintains an axial spacing from the locking cavity 38 by way of the biasing element 20 when in the unlocked position.

Figure 5:
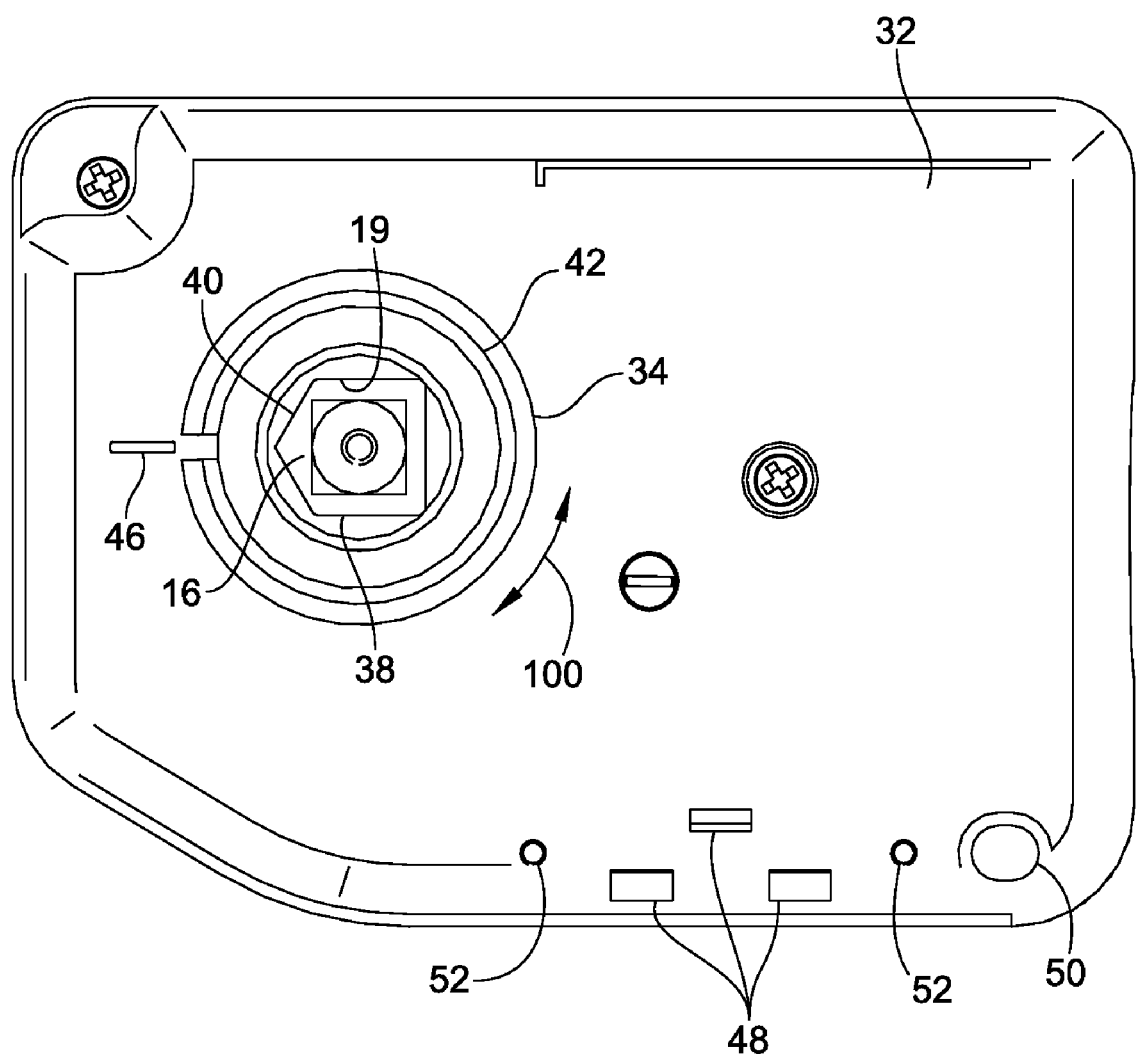
FIG. 5 is a top cross sectional view of a locking feature of the locking button arrangement of FIG. 2 inserted into a locking cavity of a locking button recess of a housing of the valve actuator of FIG. 1.

With reference now to FIGS. 4 and 5, the locking button 14 as illustrated in the locked position. When the locking button 14 is in the locked position, the locking feature 16 of the locking button 14 is disposed within the locking cavity 38 of the locking button recess 34. Also, when the locking button 14 is in the locked position, the biasing element 20 is compressed within the channel 36 of the locking button recess 34.

When the locking button 14 is in the locked position within the locking button recess 34, the locking button 14 is prevented from rotation relative to the locking button recess 34. As a result, the sleeve 22 is also prevented from rotation about the center axis of the locking button recess 34 because the sleeve 22 cannot rotate relative to the locking button 14. Also as discussed above, the lock out shaft 78 cannot rotate relative to the sleeve 22. Accordingly, when the locking button 14 is in a locked position the entire drive train assembly 70, including the actuator coupling sleeve 82 is prevented from rotation.

Turning now to FIG. 5 the locking feature 16 of the locking button 14 is shown in the locked position within the locking cavity 38 of the locking button recess 34. As illustrated, the locking feature 16 is generally five-sided figure possessing generally the same dimensions as the locking cavity 38 such that the locking feature 16 and locking cavity 38 maintain a keyed complimentary mating relationship. As a result, when the locking feature 16 is in the locking cavity 38 it cannot rotate thereabout.

When the locking feature 16 of the locking button 14 is disposed within the locking cavity 38 of the locking button recess 34, and when the actuator return device 76 attempts to drive the drive train back to the predetermined position of the valve actuator 10, the first peripheral locking surface 19 of the locking feature 16 will frictionally engage the second peripheral locking surface 40 of the locking cavity 38.

The frictional contact between the first and second locking surfaces 19, 40 caused by the torque provided by the actuator return device 76 is strong enough to resist the axial biasing exerted upon the locking button 14 by the biasing element 20 thereunder. Because the locking button 14 maintains a locked position with the locking button recess 34 via frictional contact between the first and second locking surfaces 19, 40, the locking button 14 will return to the unlocked position once this frictional contact is removed. Accordingly, once the power is resupplied to the valve actuator 10 and more particularly to the motor 72, the drive train will rotate the lock out shaft 78 in a direction opposite to the direction of rotation supplied by the actuator return device 76, which will ultimately result in the frictional contact between the first and second locking surfaces 19 and 40 to cease.

As discussed above, the locking cavity 38 receives the locking feature 16 by pure axial translation of the locking button 14. As a result, the overall stress exerted upon the locking button 14 when in the locked position is reduced because the locking button 14 is not subjected to any distortion or bending moments unlike other locking mechanisms, but is generally under torsional stress due to the engagement of the first and second lock out surfaces 19, 40.

Once the frictional contact between the first and second locking surfaces 19 to 40 ceases, the biasing element 20 will freely bias the locking button 14 axially away from the locking button recess 34 in such a way that the locking feature 16 is ejected from and disposed axially above the locking cavity 38. Therefore, by simply resupplying energy to the valve actuator 10 from a power supply the valve actuator 10 will resume normal operation and not experience any locking or jamming due to the locking button 14 and locking cavity 38 relationship as discussed above.

With general reference to FIG. 1 and particular reference to FIG. 5, the locking button recess 34 is formed into the top 32 of the housing 30. The locking button 14 is configured to lock directly to the housing 30 of the valve actuator 10 via the locking recess 34 formed into the top cover 32. In certain embodiments, the housing and locking button are manufactured from a formed plastic such that the features of the locking button recess 34 and the locking button 14 are formed simultaneously during injection molding, for example.

Figure 6:
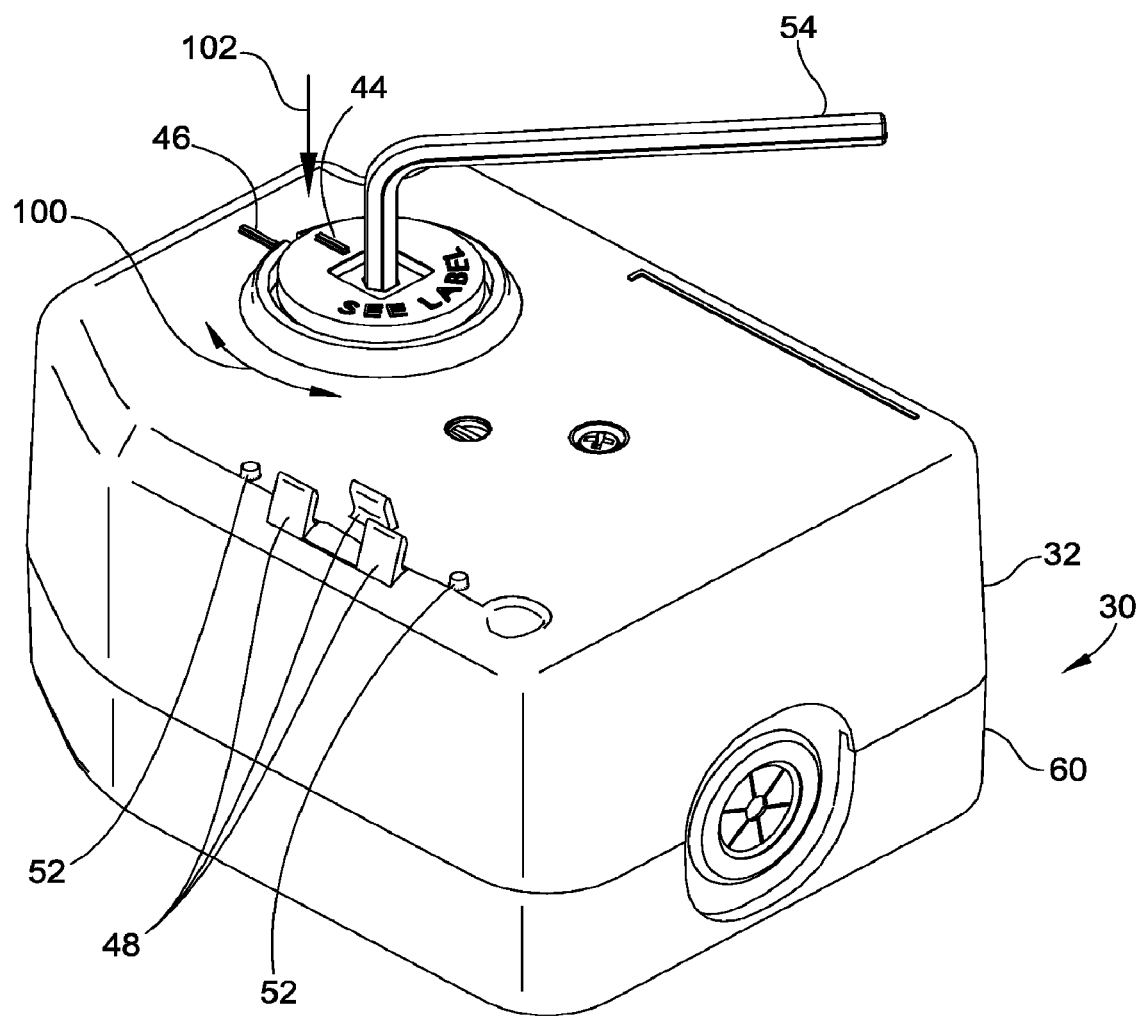
FIG. 6 is a prospective view of the valve actuator with a tool inserted into the locking button arrangement of FIG. 2.

With reference to FIG. 6, the top 32 of the housing 30 includes a first reference mark 46 and the locking button 14 includes a second reference mark 44 to indicate by their radial alignment when the locking button 14 is in the appropriate position such that the locking feature 16 will slidably and axially engage the locking cavity 38. The drive train assembly 70 is configured such that a certain number of rotations of the sleeve 22 results in a certain amount of opening or closing of a valve coupled to the actuator coupling sleeve 82 of the valve actuator 10. For example, in one embodiment, eight rotations of the sleeve will result in a 90° rotation of the actuator coupling sleeve 82, and in turn the valve stem coupled thereto. This information allows the user to determine how many turns of the locking button arrangement 12 are required to open or close the valve coupled to the valve actuator 10 a desired amount before placing the valve actuator 10 in the locked position.

With reference to FIG. 6, the top 32 of the housing 30 includes a plurality of tool retaining clips 48 and tool risers 52. The tool retaining clips 48 fixedly attach the tool 54 to the housing 30. The tool risers 52 minimize the overall surface contact between the tool 54 and the housing 30 so that a user can easily remove the tool 54 from the tool retaining clips 48.

Having discussed the structural attributes of the valve actuator 10 as described above, a description of the operation of the valve actuator 10 is provided herein below.

Turning now to FIG. 6, to place the valve actuator 10 in the locked position, a user inserts an end of the tool 54 into the tool aperture 26 of the sleeve 22. The user then rotates the sleeve so as to provide a torque in a direction 100 that opposes the torque supplied by the actuator return device 76 until the locking feature 16 is in axial alignment with the locking cavity 38.

With reference to FIGS. 5 and 6, once the user brings the locking feature 16 into axial alignment with the locking cavity 38, the user can depress the locking button 14 relative to the sleeve 22 into the locking cavity 38 by simply pressing the locking button 14 in an axial direction 102 towards the housing 30 and thereby engage the same. Once the locking button 14 is fully depressed into the locking button recess 34 such that the locking feature 16 of the locking button 14 is received by the locking cavity 38, the tool 54 can be removed from the sleeve 22 by maintaining downward pressure upon the locking button 14 and pulling upward upon the tool 54. The user can then relieve the downward pressure from the locking button 14 as the locking button will maintain its locked position under the frictional contact between the first and second locking surfaces 19, 40 (see FIG. 3). The end of the tool can then be placed in the tool cavity 50 and clipped to the tool retaining clip 48. To remove the locking button from the locked position, the user simply resupplies power to the motor 72 which in turn will drive the drive train assembly 70 to include the lock out shaft 78 in a direction opposite the direction supplied by the actuator return device 76. (See FIG. 1).

As discussed above the valve actuator 10 provides all of the benefits of a valve actuator 10 with a predetermined default position in the event of a power failure, while also providing a valve actuator that can manually override the default positioning functionality. The valve actuator 10 accomplishes this functionality by a locking button arrangement 12 that is selectively engageable with a housing 30 of the valve actuator 10. When in the locked, i.e. engaged position, the locking button arrangement 12 maintains a frictional contact with the locking button recess 34 via the first and second locking surfaces 19, 40.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve actuator comprising:
   a housing;
   a drive train carried within the housing; and
   a locking button arrangement operably connected to the drive train and selectively engageable with the housing between a locked position wherein rotational movement of the drive train is prohibited, and an unlocked position wherein rotational movement of the drive train is permitted; and
   wherein the locking button arrangement includes a locking button having an opening configured to receive a sleeve of the locking button arrangement, the locking button axially slideable along the sleeve between the locked and unlocked positions to selectively engage the locking button with the housing in the locked position by manipulating the button and disengage the locking button from the housing in the unlocked position by releasing the button.

2. The valve actuator of claim 1, wherein in the locked position a locking feature of the locking button is received in a locking cavity formed into a locking recess of the housing.

3. The valve actuator of claim 2, wherein the locking cavity operably receives the locking feature such that the locking button is prevented from substantial rotation relative to the locking recess when the valve actuator is in the locked position.

4. The valve actuator of claim 3, wherein the locking feature has a first locking surface, and the locking cavity has a second locking surface, wherein the first and second locking surfaces are in frictional engagement when the valve actuator is in the locked position.

5. The valve actuator of claim 2, wherein an inner shape of the locking cavity is keyed to an outer shape of the locking feature such that the locking cavity and locking feature are in a keyed complimentary mating relationship when the valve actuator is in the locked position.

6. The valve actuator of claim 4, wherein the first locking surface is an axially extending surface of the locking feature and forms an outer periphery thereof, and the second locking surface is an axially extending surface of the locking cavity and forms an outer periphery thereof.

7. The valve actuator of claim 6, wherein the drive train includes an actuator return device to bias the axially extending first locking surface against the axially extending second locking surface when the valve actuator is in the locked position.

8. A valve actuator comprising:
   a housing;
   a drive train carried within the housing; and
   a locking button arrangement operably connected to the drive train and selectively engageable with the housing between a locked position wherein rotational movement of the drive train is prohibited, and an unlocked position wherein rotational movement of the drive train is permitted,
   wherein the locking button arrangement includes a locking button having an opening configured to receive a sleeve of the locking button arrangement, the locking button axially slideable along the sleeve to selectively engage the locking button with the housing; and
   wherein the housing includes a locking button recess with an annular channel disposed therein, the annular channel configured to receive a biasing element, the biasing element operable to bias the locking button axially relative to the sleeve.

9. The valve actuator of claim 8, wherein the biasing element is operable to bias the locking button into the unlocked position, wherein in the unlocked position the locking feature of the locking button is axially disposed above a locking cavity of the locking button recess.

10. A valve actuator comprising:
    a housing;
    a drive train carried by the housing, the drive train having a plurality of interconnected gears, wherein each gear of the plurality of interconnected gears is required to transfer a torque from an input end of the plurality of interconnected gears to an output end of the plurality of interconnected gears;
    a shaft extending from one of the plurality of interconnected gears along an axis of rotation thereof such that a rotation of the shaft corresponds to a rotation of each of the plurality of interconnected gears;
    an actuator return device operably coupled to the shaft to rotate the drive train in a direction to a first predetermined position; and
    a locking button arrangement operably coupled to the shaft and selectively engageable with the housing between a locked position by manipulating the button defined by a second predetermined position other than the first predetermined position and wherein the rotational movement of the drivetrain is prohibited, and an unlocked position by releasing the button wherein rotational movement of the drive train is permitted, the locking button arrangement including a locking button axially slideable generally parallel to the axis of rotation between the locked and unlocked positions to selectively engage the locking button with the housing in the locked position.

11. The valve actuator of claim 10, wherein the locking button arrangement includes a sleeve configured to receive the shaft in a first end of the sleeve, and wherein the sleeve has a tool receiving feature in a second end of the sleeve.

12. The valve actuator of claim 10, wherein the actuator return device is operable to bias a locking button of the locking button arrangement into frictional engagement with a locking cavity of the housing such that the drive train is locked in a predetermined orientation.

13. The valve actuator of claim 12, wherein the locking button includes a locking feature having a first axially extending locking surface, and the locking cavity has a second axially extending locking surface, and wherein the actuator return device is operable to bias the first and second locking surfaces into frictional engagement.

14. A method for actuating a valve coupled to a valve actuator comprising the steps of:
    rotating a locking button arrangement operably coupled to a drive train of the valve actuator to a predetermined angular position; and
    engaging a housing of the valve actuator with the locking button arrangement by axially depressing a locking button of the locking button arrangement such that the locking button is in frictional engagement with the housing when the locking button is in the predetermined angular position;
    disengaging the housing of the valve actuator with the locking button arrangement by releasing the locking button of the locking button arrangement such that the locking button arrangement is out of engagement with the housing.

15. The method of claim 14, wherein the step of engaging includes engaging a locking cavity of the housing with the locking button, the locking button having a locking feature in a keyed complimentary mating relationship with the locking cavity such that the locking feature is prevented from rotation relative to the locking cavity when the locking cavity receives the locking feature.

16. The method of claim 14, wherein the step of rotating includes rotating a shaft of the drive train, the drive train including a plurality of interconnected gears wherein each of the plurality of interconnected gears transmits a torque from an input end of the drive train to an output end of the drive train, the shaft coincident with an axis of rotation of at least one of the plurality of interconnected gears.

17. A method for actuating a valve coupled to a valve actuator comprising the steps of:
   rotating a locking button arrangement operably coupled to a drive train of the valve actuator to a predetermined angular position; and
   engaging a housing of the valve actuator with the locking button arrangement by axially depressing a locking button of the locking button arrangement such that the locking button is in frictional engagement with the housing when the locking button is in the predetermined angular position; and
   further comprising the step of disengaging the housing of the valve actuator, wherein a biasing element received in an annular channel of the housing is operable to bias the locking button of the locking button arrangement axially along an axis of rotation of the drive train and away from the housing such that the locking button arrangement is out of engagement with the housing.

18. The method of claim 17, wherein the biasing element biases the locking button axially along a sleeve of the locking button arrangement, the sleeve operably coupled to a shaft of the drive train, the shaft coincident with an axis of rotation of the drive train.

* * * * *